United States Patent [19]

Kuroda

[11] Patent Number: 5,136,575

[45] Date of Patent: Aug. 4, 1992

[54] CANCELLING CIRCUIT AND TRANSMISSION SYSTEM

[75] Inventor: Kiyoshi Kuroda, Sapporo, Japan

[73] Assignee: Kabushiki Kaisha Myukomu, Hokkaido, Japan

[21] Appl. No.: 639,317

[22] Filed: Jan. 9, 1991

Related U.S. Application Data

[63] Continuation of Ser. No. 278,914, Dec. 2, 1988, abandoned.

[30] Foreign Application Priority Data

Dec. 16, 1987 [JP] Japan .................. 62-315994

[51] Int. Cl.[5] .................. H04L 5/14; H04N 7/14
[52] U.S. Cl. .................. 370/30; 370/32; 375/76; 379/54; 379/402; 358/85; 358/143
[58] Field of Search .................. 370/24, 27, 28, 30, 370/62, 76, 32; 375/12; 379/53, 54, 100, 392, 402, 406, 420; 358/85, 142, 143; 455/50, 59

[56] References Cited

U.S. PATENT DOCUMENTS

| | | | |
|---|---|---|---|
| 2,576,115 | 11/1951 | Hill | 455/59 |
| 3,214,691 | 10/1965 | Sproul et al. | 455/59 |
| 3,974,337 | 8/1976 | Tatsuzawa | 370/69.1 |
| 4,103,118 | 7/1978 | Berman | 379/402 |
| 4,320,498 | 3/1982 | Justice | 370/27 |
| 4,331,842 | 5/1982 | Kiko | 379/406 |
| 4,377,858 | 3/1983 | Treiber | 379/402 |
| 4,670,870 | 6/1987 | Hewinson et al. | 370/28 |

Primary Examiner—Benedict V. Safourek
Assistant Examiner—Young Tse
Attorney, Agent, or Firm—Jordan and Hamburg

[57] ABSTRACT

The present invention is a transmission system in which there are provided a bridge circuit in which a balanced condition is provided in an entire frequency band usable for a wire transmission line or a portion thereof, and a cancelling circuit in which a simultaneous two-directional communication is enabled by using the same frequency or the frequency adjacent thereto, and there are provided said cancelling circuits at both terminal devices opposite to each other through a transmission line, thereby enabling said simultaneous two-directional communication.

6 Claims, 11 Drawing Sheets

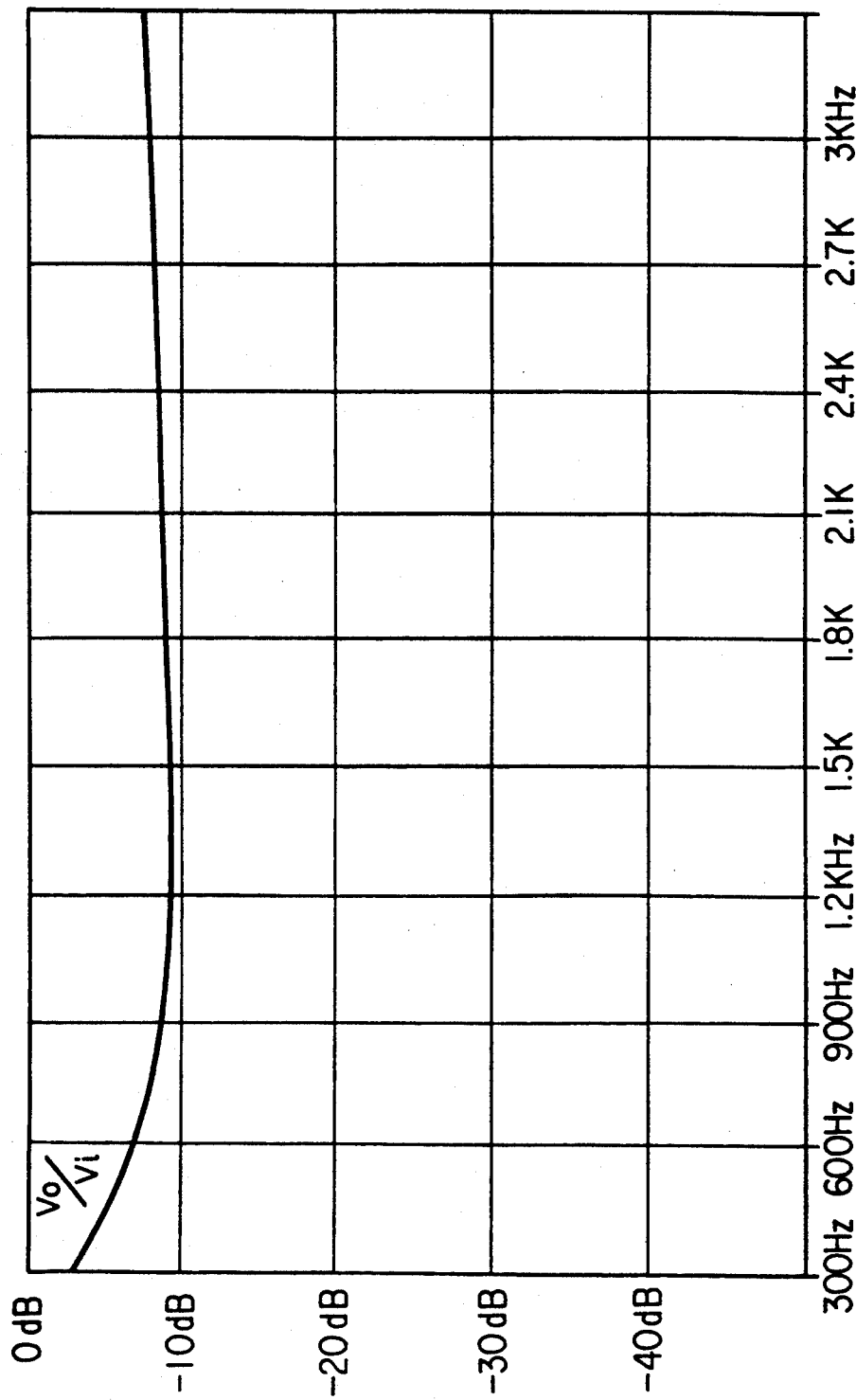
FIG. 4(4-1)

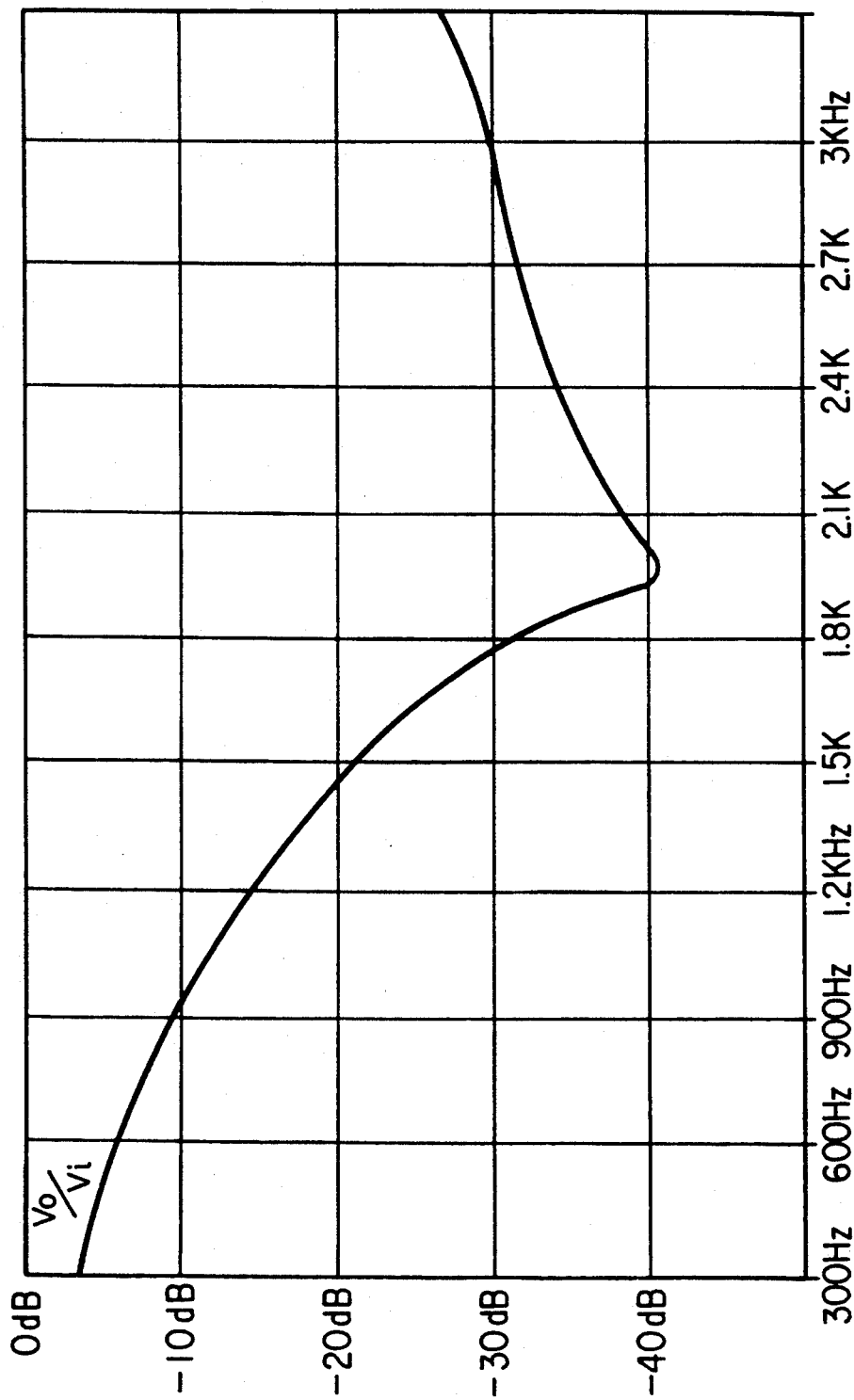
FIG. 4(4-2)

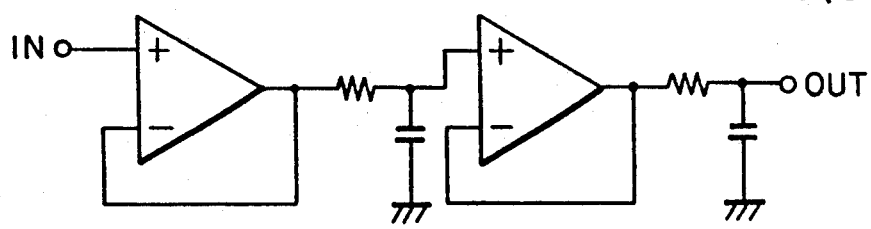
FIG.5(5-1)
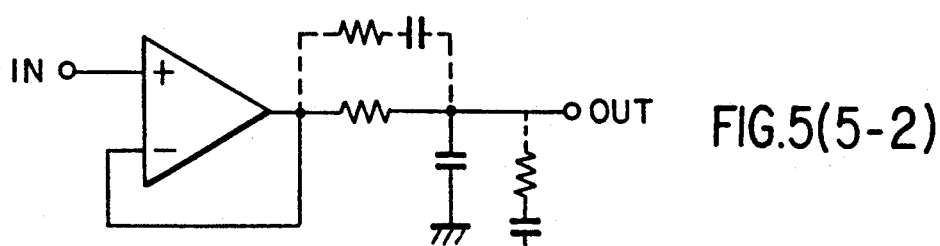
FIG.5(5-2)
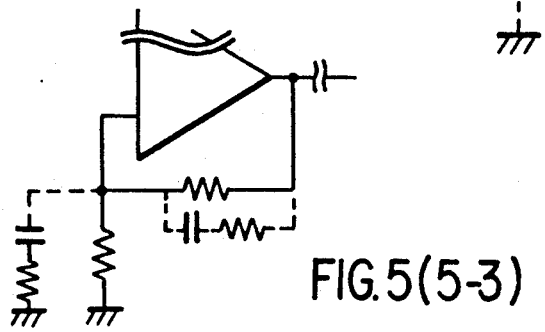
FIG.5(5-3)
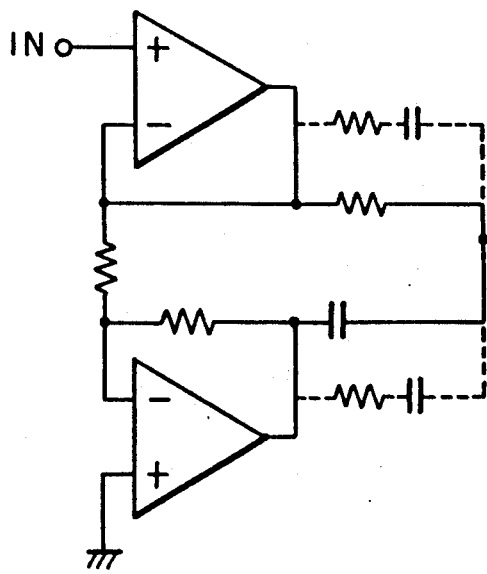
FIG.5(5-4)
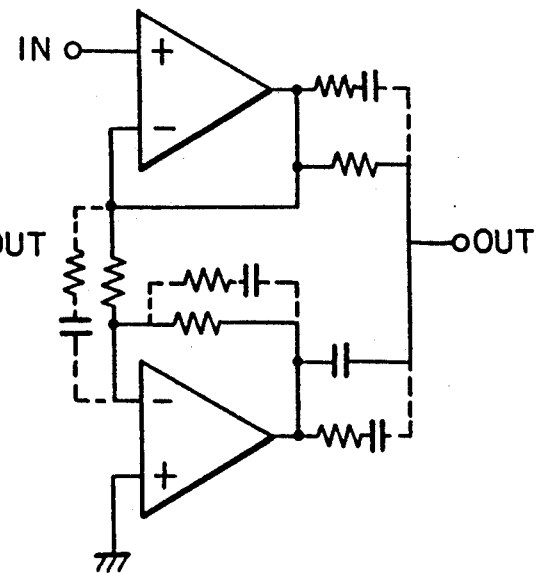
FIG.5(5-5)

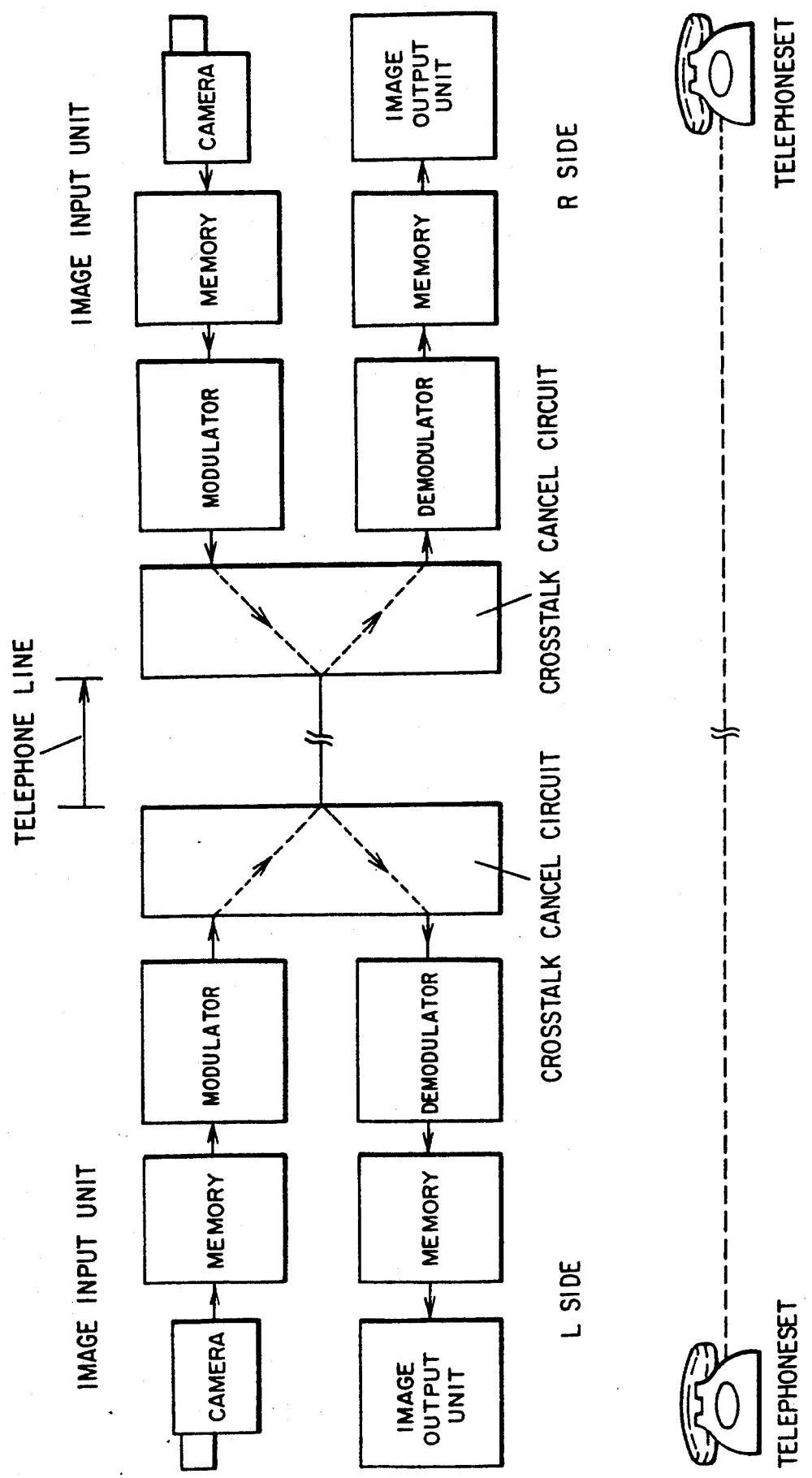

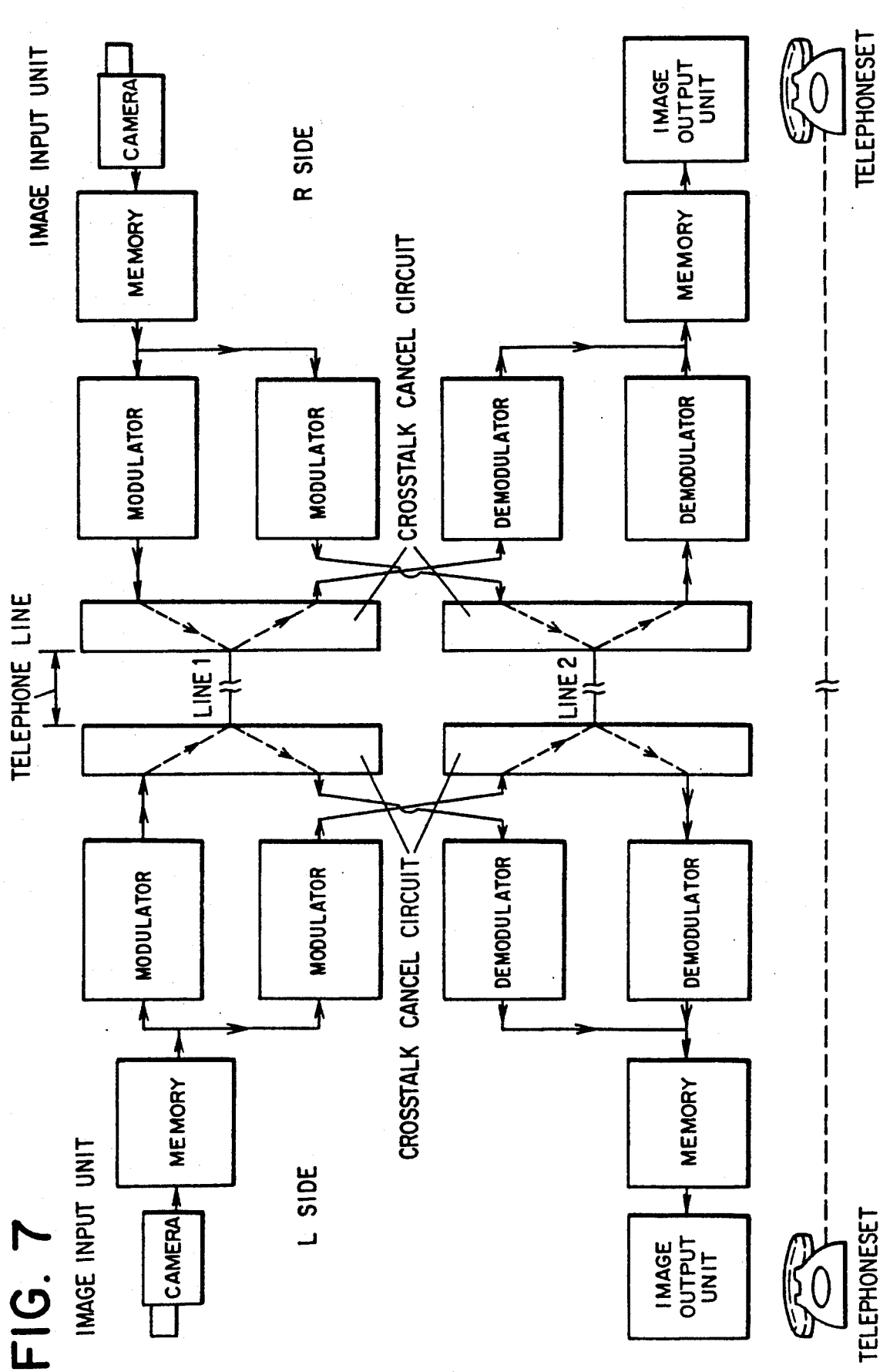

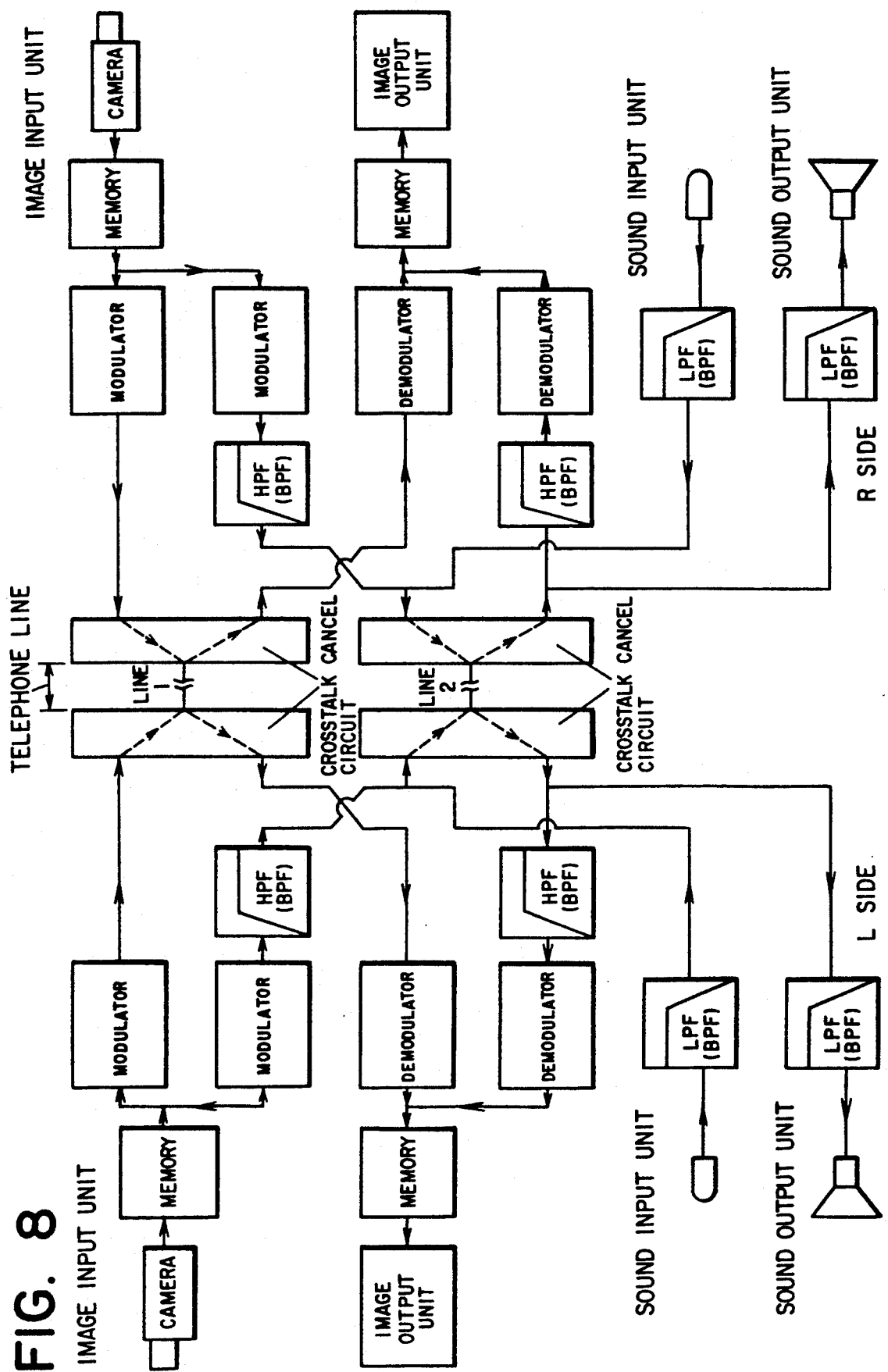

CANCELLING CIRCUIT AND TRANSMISSION SYSTEM

This application is a continuation of application Ser. No. 07/278,914, filed Dec. 2, 1988, now abandoned.

FIELD OF THE INVENTION AND RELATED ART STATEMENT

The present invention relates to a cancelling circuit and a transmission system using the cancelling circuit in a communication of a television telephone signal in a wire or wireless system, MODEM and the like.

It is general for conventional terminal devices such as a telephone and a MODEM to adapt a communication system in which a simultaneous two-directional communication is effected by using only one transmission line. It is necessary for the simultaneous two-directional communication to discriminate a transmitting signal from a receiving signal. If the ability for discriminating them (crosstalk characteristics) is low, the telephone generates howling and a MODEM or the like increases error. Then, there has been used a hybrid circuit (hereinafter referred to simply as HYB) has been used in the telephone and MODEM to effect the discrimination of the transmission and reception signals. The crosstalk characteristic in the case of using a general HYB circuit is within the degree as shown in the graph of FIG. 4 (4-1). Therefore, the HYB circuit achieves a sufficient performance in the case of the telephone having a purpose of telephone call, however it was impossible for the television telephone and MODEM or the like having a purpose of the data communication such as image and character except the telephone call to effect the simultaneous two-directional communication for data with the same carrier frequency by using the HYB. For example, there is the telephone set called as "memo telephone set" capable of transmitting image and characters with a telephone call. Though the telephone set can achieve the two-directional communication for the telephone call simultaneously, image and characters are transmitted only in one direction.

In this circumstance, a simultaneous two-directional communication of image and character data in order to obtain the necessary discrimination ability (crosstalk characteristics) by using a frequency separation communication system for modulating the reception signal and the transmission signal by using respectively different carrier waves thereby converting them into respectively different frequencies, together with the above-mentioned HYB circuit.

The frequency division communication system has insufficient efficiency for a transmission line. If it becomes possible to effect the simultaneous two-directional communication of both image and character signals with the same carrier frequency, it is possible to use frequency bands which have not been used, for other transmission of audio i.e. sound and data signals thereby resulting in communication with good efficiency.

OBJECT AND SUMMARY OF THE INVENTION

The object of the present invention is to use a transmission line used for effecting a communication with high efficiency.

Another object of the present invention is to achieve a simultaneous two-directional communication for the data of sound, image and character.

The cancelling circuit of the present invention is composed of a bridge circuit having a balanced condition in an entire frequency band or a portion of the frequency band of a wire transmission line, and the cancelling circuit makes possible a simultaneous two-directional communication of data such as sound, image and character by using the same frequency or the frequency adjacent thereto.

The cancelling circuit of the present invention has a bridge circuit including a frequency characteristic compensation circuit and a phase shifting circuit, and the bridge circuit compensates the influence due to the impedance change of the transmission line and the unbalanced condition due to the elements per se constituting the circuit, thereby obtaining a relative balanced condition.

According to the transmission system of the present invention, there are provided cancelling circuits in both terminal devices disposed at both ends of the transmission line, and the cancelling circuit is composed of the bridge circuit for providing a balanced condition in the entire frequency band or a portion of the frequency band in which the transmission is possible, thereby enabling the simultaneous two-directional communication of sound, image, character or the like in the same frequency or the adjacent frequency.

The features of the present invention will be understood in more detail from the following descriptions on the basis of the attached drawings.

BRIEF DESCRIPTION OF THE DRAWINGS

FIG. 4 (4-1) is a graph showing a crosstalk characteristic of HYB circuit generally used.

FIG. 4 (4-2) is a graph showing a crosstalk characteristic of HYB circuit of the present invention.

FIGS. 5 (5-1) to (5-3) are views showing examples of frequency characteristic compensation circuits respectively.

FIG. 5 (5-4) is a view showing an example of a phase compensation circuit.

FIG. 5 (5-5) is a view showing an example circuit in which a frequency characteristic compensation and a phase compensation are effected.

FIGS. 6-10 are block diagrams showing embodiments of transmission system respectively.

DESCRIPTION OF THE PREFERRED EMBODIMENTS

Figure 1:
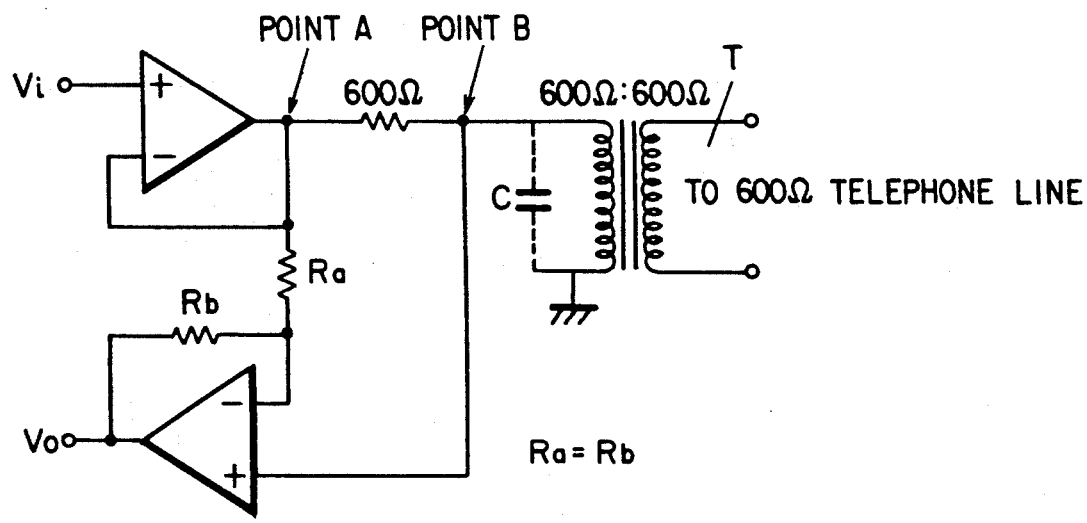
FIG. 1 is a HYB circuit diagram generally used.

In order to provide better understanding of the present invention, a conventional HYB circuit will be explained hereinafter. FIG. 1 shows a conventional HYB circuit frequently used recently which is composed of a transformer and an operational amplifier. This HYB circuit comprises a bridge circuit having a balanced condition achieved when the pure resistance of a telephone line is 600 Ω and the transformer is an ideal one with C=0. At the balanced condition, the input signal inputted from Vi is not outputted to Vo. However, an actual impedance of an telephone line is not a pure resistance and further an actual transformer is also never ideal one, therefore the crosstalk characteristic obtained actually becomes at most that as shown in FIG. 4 (4-1). As is apparent from the figure, the HYB circuit results in a difficulty of simultaneous transmission/reception of data by means of the same frequency, since about ⅓ (−10 dB) of the signal Vi is outputted from Vo as a reception signal.

It is considered that the balanced condition is hardly obtained greatly by the influence of the circuit elements per se (transformer, condenser C) used for the HYB circuit, though it is also the cause of making difficult the balanced condition that the transmission line does not have a pure resistance of 600 Ω. The reason why the balanced condition is hardly obtained is that according to the general tuning circuit composed of a transformer and a condenser C, having a band pass effect for the purpose of eliminating noise or the like from the transmission line, an unbalanced condition due to a phase difference between the voltages at A and B points in the frequency except the resonance frequency.

Under the circumstance, it is the object of the present invention to improve the crosstalk characteristic. Namely, according to the present invention utilizing the HYB circuit as shown in FIG. 2, there is provided the balanced condition in the bridge circuit of the HYB circuit by making relatively zero the voltage and phase differences between the points A and B (FIG. 1), thereby obtaining an effect of improved crosstalk characteristics.

Figure 2:
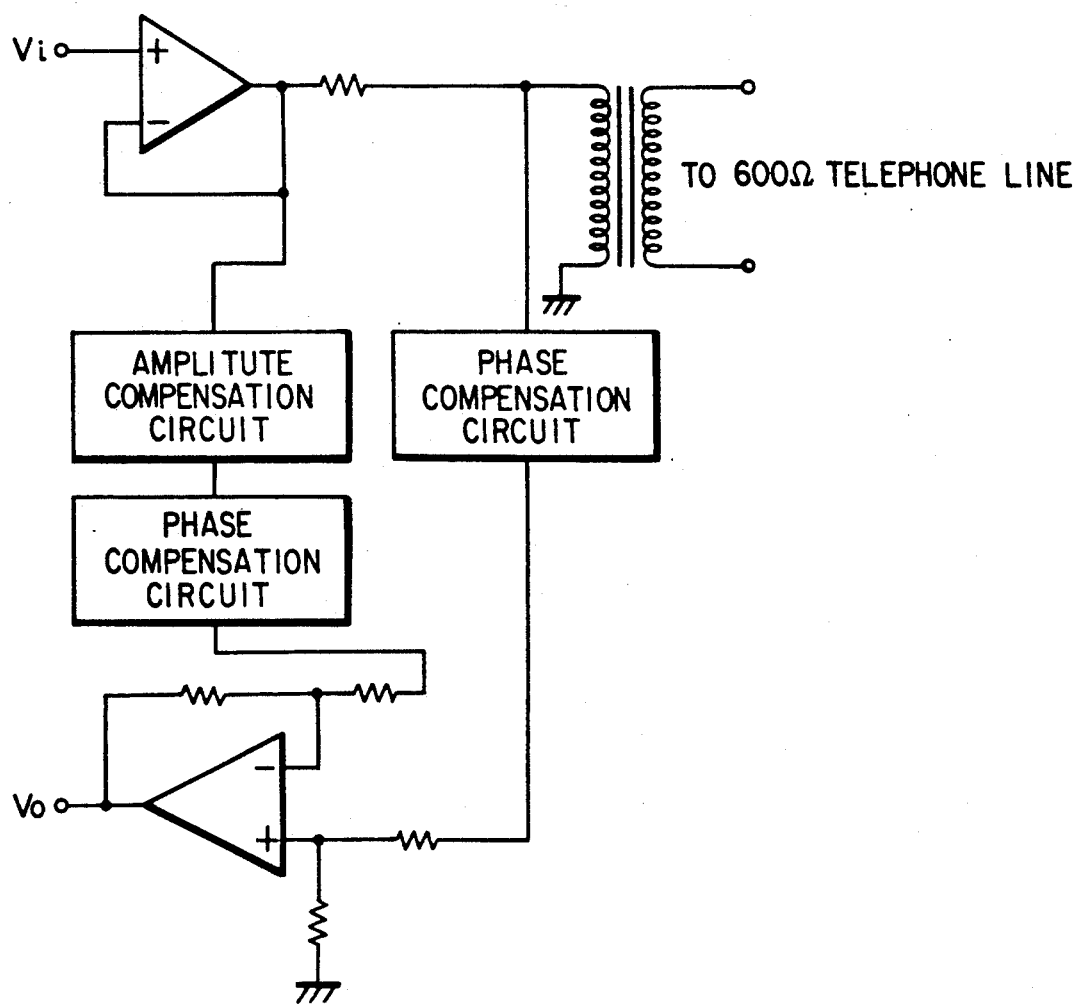
FIG. 2 is a block diagram showing a basic constitution of the present invention.
Figure 3:
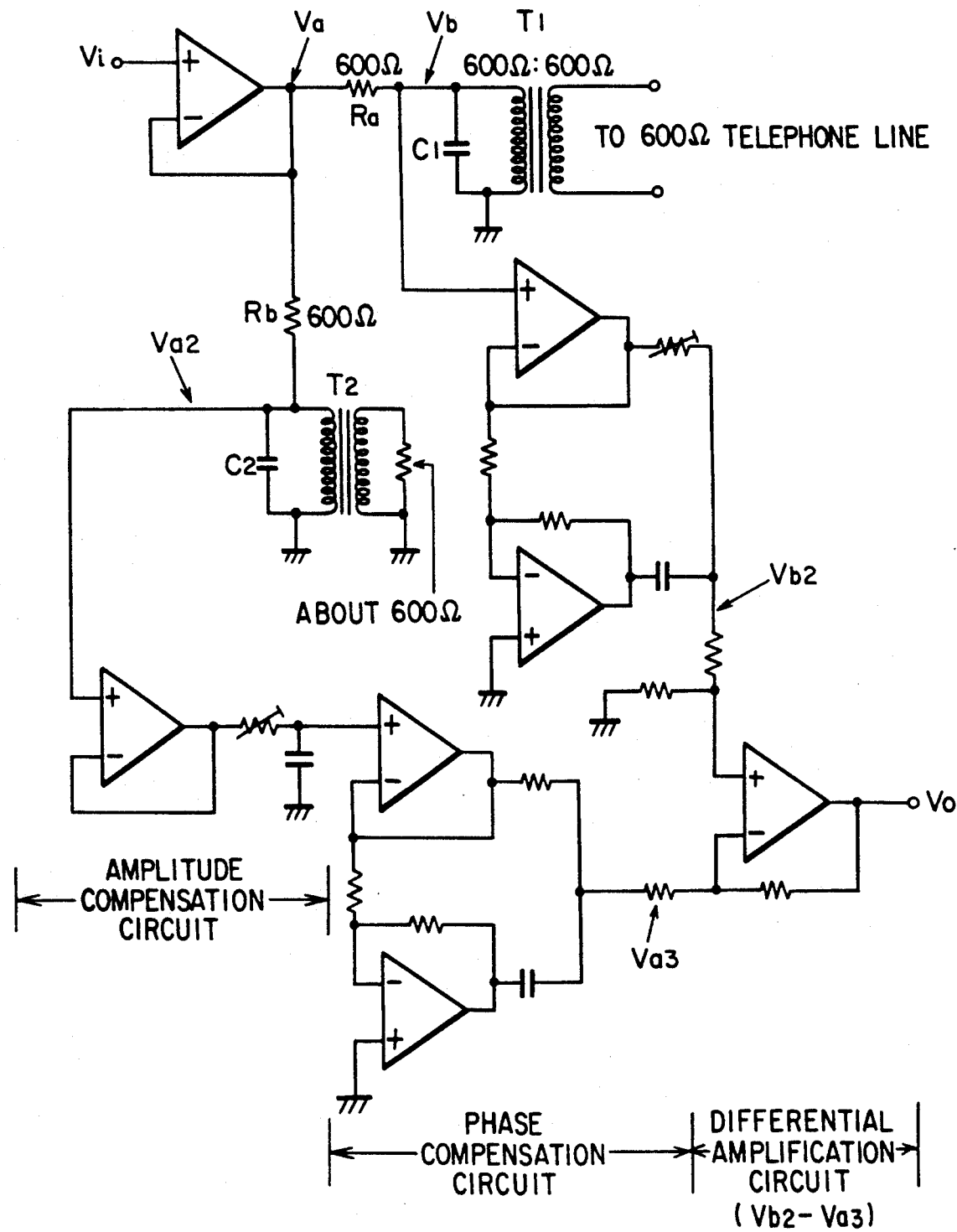
FIG. 3 is a view showing a specific example of the circuit of the present invention.

Namely, FIG. 2 is a block diagram of a circuit for compensating the amplitude and phase of the voltage or current between the points A and B of the conventional circuit of FIG. 1. In the circuit block diagram, an amplitude compensating circuit and a phase compensating circuit are connected in series with one another between the operational amplifiers respectively disposed at the input and output sides of the conventional HYB circuit in FIG. 1, and another phase compensating circuit is connected between the transformer and the operation amplifier disposed at the output side. With this circuit construction, the amplitude and phase of the voltage or current at the points A and B become the same respectively, or change in the same relative manner. FIG. 3 is a specific circuit example corresponding to the circuit block diagram shown in FIG. 2.

This circuit example has a purpose to improve the crosstalk characteristics about at 2-3 KHz, and the improved characteristic is shown in FIG. 4 (4-2).

The circuit of FIG. 3 is explained hereinafter.

The bridge circuit is composed of a transformer T1, a condenser C1, a resister Ra, a transformer T2 connected with the resister 600 Ω as a load, a condenser C2, and a resister Rb. The transformers T1 and T2 have the same standard with each other, if C1=C2 and Ra=Rb, the change in amplitude and phase due to these elements is relative, therefore the voltage Va2 is substantially equal to the voltage Vb. However, the transformer T1 is connected with the telephone line and the transformer T2 is connected with a pure resistance, therefore an error is undesirably generated between the voltages Va2 and Vb due to a substantial impedance change of the telephone line.

It may be possible to provide a bridge circuit in which the transformer T2 is connected with an element, as a load, having the same impedance change as the telephone line, however the present invention presents an equivalent bridge circuit in which the difference is made zero relatively by means of a compensation by using a high band amplitude compensating circuit and a phase shifting circuit. The voltages Vb2 and Va3 become Vb2=Va3 when Vi is inputted thereby outputting no signal from the terminal Vo but to the telephone line. Furthermore, the transmitted signal from the telephone line outputs at Vb2 but not outputs at Va3, therefore the transmitted signal Vi can be discriminated from the received signal.

This circuit example is considered for application to the television telephone or the like, and it is possible to effect the simultaneous two-directional communication of an image signal with 2 KHz-3.4 KHz out of the frequency band utilizable for transmission of telephone line by using the carrier frequency with the same as above frequency or the adjacent carrier frequency, and of a sound signal with 300 Hz-2 KHz. Furthermore, the sound signal for the telephone call is transmitted by the band 300 Hz-2 KHz. The circuit of FIG. 3 is used for the purpose mentioned above, therefore the compensation for the frequency band used for the sound signal is not effected, but the compensation for the frequency band for the image signal which greatly receives the influence due to the crosstalk characteristic is effected. Therefore, the characteristic is deteriorated below 2 KHz, as shown in the graph of FIG. 4 (4-2) but a good characteristic is obtained over more wider band by increasing the number of the circuits for compensating the amplitude and phase or the number of the elements for effecting the compensation as shown in FIG. 5. By this, it may be considered to apply an entire dual data communication using the same carrier frequency by a high speed MODEM or the like. In this case, the phase characteristic becomes important in accordance with a modulation type, then a good result may be obtained by passing the receiving signal Vo into the circuit having the phase characteristic reverse to the phase shifting circuit.

It may be considered that the element constant for compensating the amplitude and phase may be selected to a fixed type, a semi-fixed type, and an automatically balancing type in accordance with a required performance. If the element constant is the automatically balancing type, the amplitude and phase of Vb2 and Va3 are detected and controlled such that they become coincident with each other. The dashed line circuits of FIG. 5 show the use of multiple time constants, to enable the setting of the compensation to approximate the characteristics of the communication line.

Some examples of transmitting system made possible by utilizing the circuit of the present invention will be explained hereinafter.

FIG. 6 shows an example of a simultaneous two-directional communication of image data by using one telephone line. The example as shown in FIG. 6 has the following advantages in comparison with the semi-dual transmission system used in general. According to the example of FIG. 6, since the transmission and reception of data are simultaneously achieved, it is possible to reduce the transmission time. On the other hand, it was necessary for the semi-dual transmission system to reduce the transmission rate and make the multiplication by using the frequency separation system to achieve the simultaneous two-directional transmission. Otherwise, it was necessary to provide two transmission lines for the transmission use and the reception use respectively. However, according to the example of FIG. 6 the same carrier can be utilized for the transmission/reception, and the telephone line may be only one without reducing the transmission rate thereby providing a low cost system.

As seen in FIG. 6, each side of the system includes a camera having its output directed to a memory, the output of the respective memory being applied to a crosstalk cancel circuit. In addition, an output of the crosstalk cancel circuit is directed to a demodulator, whose output is applied to a memory, and thence to an image output unit. The two crosstalk cancel circuits are intercoupled via a telephone line.

Of course, this circuit example becomes a television telephone system by adding an additional telephone line as shown by dotted line in FIG. 6. The circuit constitution of this example is for the image communication, however the circuit is applicable for a data communication due to MODEM or the like.

FIG. 7 shows an example in which a high transmission more than the example of FIG. 6 is necessary. In this example two telephone lines are used in parallel, and if more high transmission is required, many telephone lines may be used. This example is also for the transmission system of the image data, but it is necessary for the transmission of the image provided by a camera, since there is a limit in the transmission frequency range, to once memorize the image data from the camera in the memory means such as a memory or the like, and then read out at the signal rate suitable for the transmission due to the telephone line, to transmit the image data. At this time, if for example two telephone lines are used and each telephone line transmits the half of the data read out in each telephone line, it is possible to transmit data of two times within the same time, even though the transmission time is the same for each telephone line. As a result, the transmission rate is increased by two times. At the reception side, the signals transmitted by the plural telephone lines are decoded respectively, the decoded data is synthesized and memorized in the memory and read out with a suitable reading rate to display it on an image displaying unit. Also in this example, if a telephone line as shown by the dotted line in FIG. 7 is added thereinto, it becomes a television telephone system that is similar to that in FIG. 6.

As seen in FIG. 7, each side of the system includes a camera having its output directed to a memory, the output of the memory being applied to two modulators. Each side of the system further includes two cross talk cancel circuits connected to receive the outputs of separate modulators. The crosstalk cancel circuits have outputs connected to separate demodulators. The output of the demodulators are coupled to a memory, and thence to an image output unit. Each crosstalk cancel circuit of each side is connected to a crosstalk cancel circuit of the other side via a separate telephone line, i.e. lines LINE 1 and LINE 2.

FIG. 8 shows an example of a transmission system in which sound signals for the telephone call are made multiplication by a frequency division communication system, as an application example of FIG. 7. In the communication of image data, it is possible for increasing a transmission rate to set the carrier frequency to about the upper limit of the usable frequency range for the transmission line, and to make the used frequency band narrow by the SSB system. In the case where the frequency of e.g. 2 KHz-3.4 KHz is used for the image data, if the crosstalk cancelling circuit of the present invention is used, the simultaneous transmission/reception communication becomes possible with the same carrier frequency, thereby enabling the communication of other data by using the frequency band below 2 KHz.

In FIG. 8, the frequency band is used for communication of sound signals in the telephone set. In this example, the telephone line 1 has no multiplication of sound signals and the telephone line 2 has the multiplication of sound signals, and it may be considered as an application example to transmit the sound signals in a stereo mode with the multiplication of both telephone lines 1 and 2. The above is applicable to the system using the telephone lines more than two, and it will be necessary in a meeting using the television telephone to provide multichannels for the sound signals. In the example of FIG. 8, a multiple transmission of the sound signals and image data is effected, therefore it is not necessary to use the additional telephone line as shown in FIGS. 6 and 7, thereby reducing the cost. However, on the other hand there is a disadvantage that since the multiplication is achieved by using the frequency division communication system, clearness of the sound signals is deteriorated.

The arrangement of FIG. 8 is the same as that of FIG. 7, except that a high pass filter is connected to the output of one of the modulators on each side of the system, and a high pass filter is connected to the input of one of the demodulators on each side of the system. In addition, instead of the separate telephone sets on each side of the system, each side has a sound input unit connected via a low pass filter to one of the respective crosstalk cancel circuits, and the output of this crosstalk cancel circuit is also directed to a sound output unit via a low pass filter.

Figure 9:
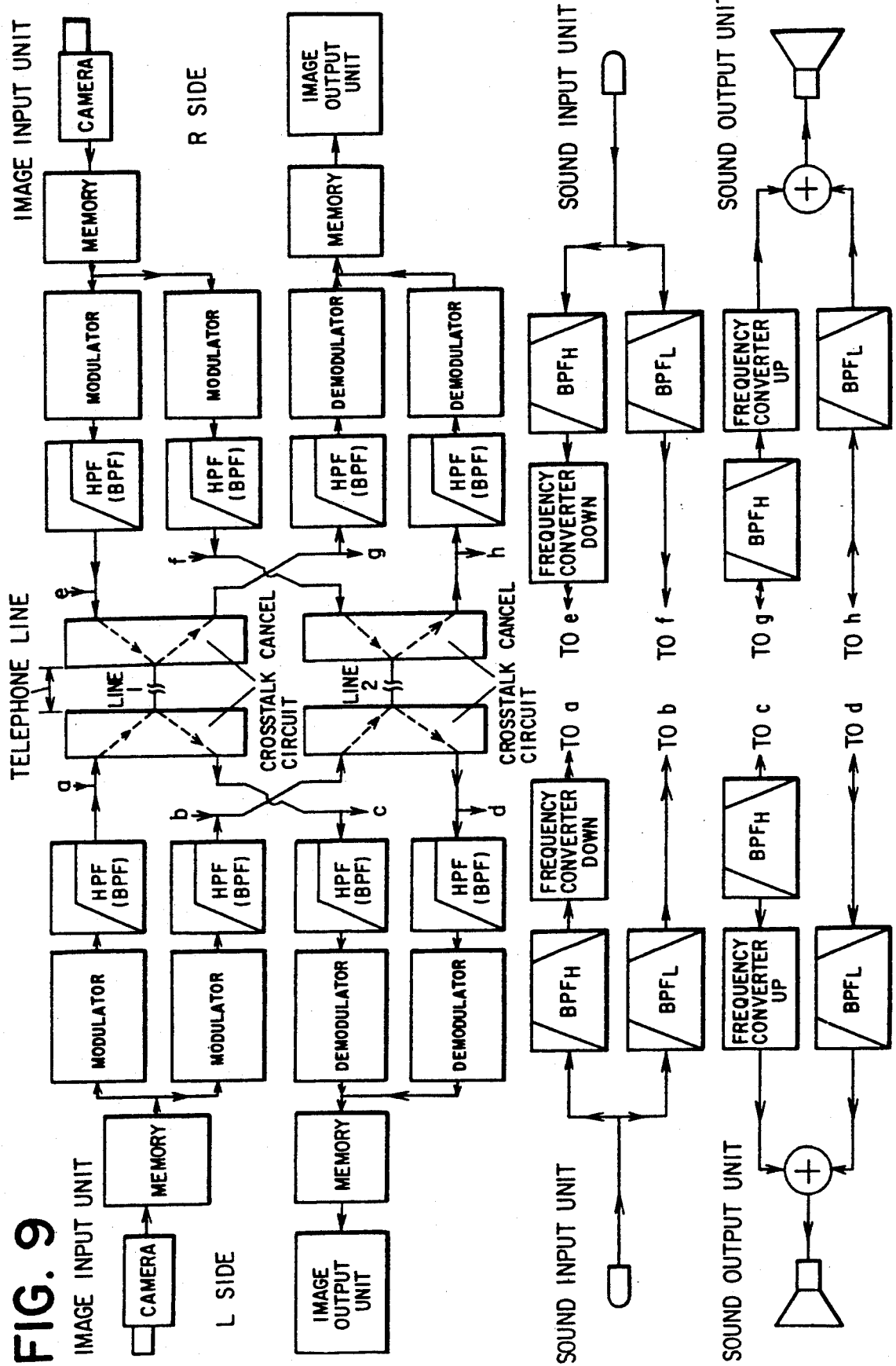

FIG. 9 shows the example for solving the above-mentioned disadvantage, in which there are used two or more than two telephone lines to increase the transmission rate. In the example, the clearness of the sound is improved by that when there are frequency bands which are not used on the respective lines, the non-used frequency bands are used.

In the example of FIG. 9, if the image data is transmitted on the telephone lines 1 and 2 by using the frequency band of 2 KHz—3.4 KHz as is similar to that of FIG. 8, the frequency band of 300 KHz-2 KHz is not used on the lines 1 and 2 respectively. The sound signals are transmitted by utilizing the unused frequency band, but the sound signal having the frequency of 300 Hz-3.4 KHz can not be transmitted even by using the frequency band of 300 Hz-2 KHz on the telephone lines.

Under the circumstance, the frequency band of 300 Hz-3.4 KHz on which a sufficient clearness of sound can be obtained, is divided into a high band and a low band by using filters. According to the example of FIG. 9, the frequency band is divided into two bands, since the example uses two telephone lines. The number of division can be set in accordance with the number of the used telephone lines or the width of the unused bands on the respective lines. In the case of two separations, if the frequency at which the band is divided is set to 1 KHz, a high band becomes one of 300 Hz-1 KHz and a low band becomes one of 1 KHz-3.4 KHz. The signal in the low band is transmitted on the line 2. On the other hand, since the signal in the high band is within the frequency of 1 KHz-3.4 KHz, if the signal is transmitted on the line 1, the sound signals are undesirably superimposed with the image signals. Then, the high band is further made ½ by using a frequency shift down circuit. By this method, the frequency signal of 1 KHz-3.4 KHz is converted into the frequency signal of 500 Hz-1.7 KHz, therefore it becomes possible to transmit the sound signals together with the image data signals.

At the reception side, the received sound signals on (the low band of 300 Hz-1 KHz through the telephone line 2 is derived from the filter, and the filtered signals are synthesized with the other sound signals thereby obtaining the simultaneous two-directional communication of the sound signals and the image data signals within the band of 300 Hz -3.4 KHz. The above-mentioned other sound signals are generated by converting the high frequency band of sound signals of 500 Hz-1.7 KHz transmitted through the telephone line 1 into the frequency band of two times i.e. 1 KHz-3.4 KHz by using a shift-up circuit. The frequency at which the band is divided is not limited to the above-mentioned 1 KHz, and further the shift-down and the shift-up frequencies are not also limited to the above-mentioned $\frac{1}{2}$ and 2 respectively. Those frequencies may be decided in accordance with the actually used telephone lines and the unused frequency band.

It is considered for increasing a utilization efficiency of the transmission line 1 to increase a transmission rate and 2 to make possible an entire dual communication rather than a half communication. It is considered for the television telephone system that since it is necessary to transmit the sound signals for the telephone call, the sound signals should be transmitted together with the image data signals by using the frequency division system for the sound signals. In an actual conversation on the telephone, it is quite rare to continue the conversation without any interval in time, therefore it is possible to further increase the utilization efficiency of the transmission line by detecting the time interval in which the conversation is interrupted and utilizing the time interval for the transmission of the image data signals through the frequency band used for the sound signals.

The arrangement of FIG. 9 is thus similar to that of FIG. 7, except that a high pass filter is connected to the output of each modulator and to the input of each demodulator. Instead of the individual telephone sets, in the system of FIG. 9 the output of a sound input unit is coupled to one of the respective crosstalk cancel circuits via a high pass filter and a frequency down converter, and to the other of the crosstalk cancel circuits via a low pass filter. Further, an output of one of the respective crosstalk cancel circuits is coupled to a sound output unit via high pass filter, an up converter and a summing device, and the output of the other crosstalk cancel circuit is coupled to the summing device via a low pass filter.

Figure 10:
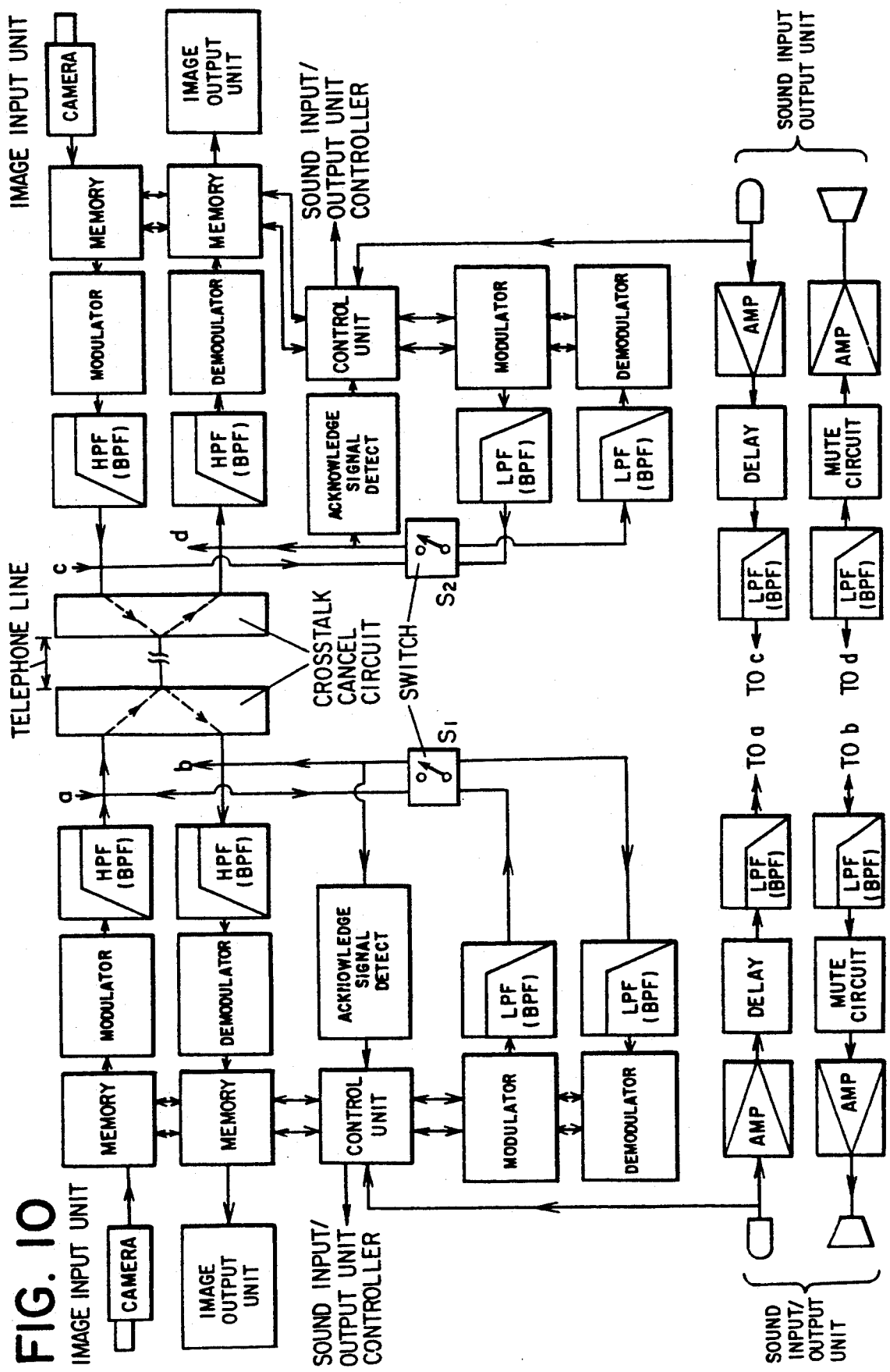

FIG. 10 is a block diagram for realizing the above, and the simultaneous two-directional communication is achieved by using a crosstalk cancelling circuit. The method per se is applicable to the multiple transmission of the sound signals for conversation and the image data, and further usable for the cases of one telephone line or two or more numbers of the lines, and of a wire system or a wireless system.

Figure 11:
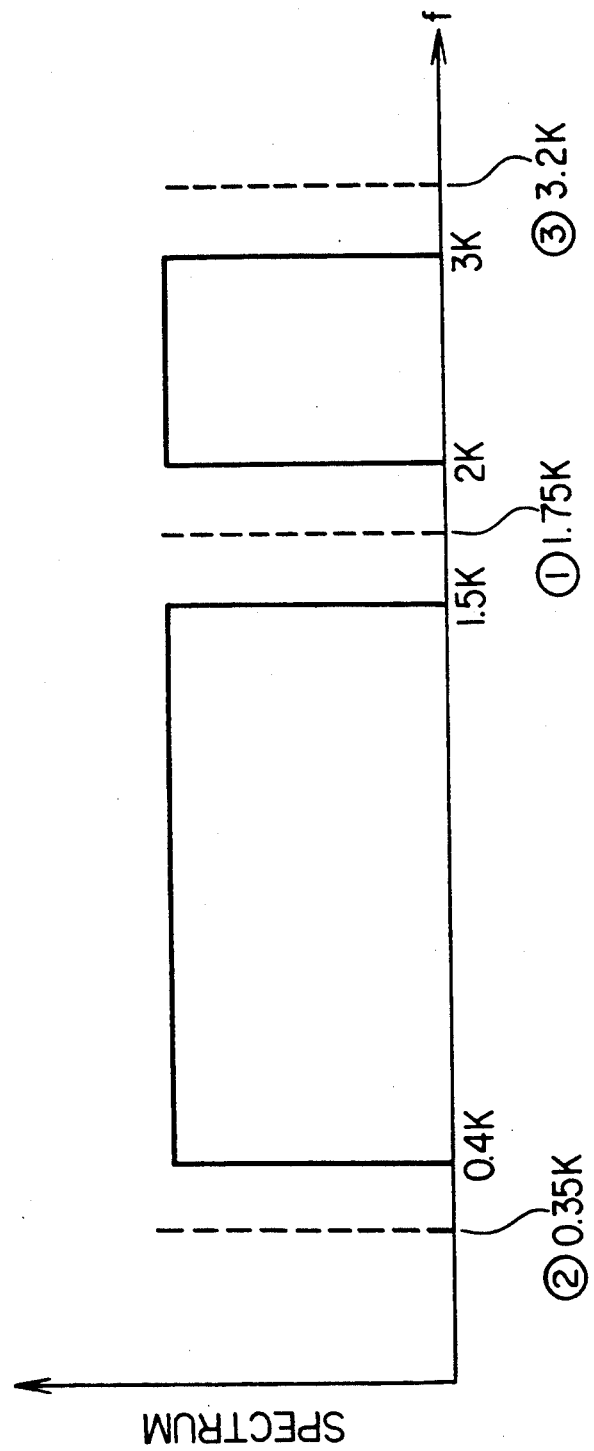
FIG. 11 is a view showing a spectrum in a method of multi-transmitting an acknowledge signal when the transmission system as shown in FIG. 10 is used wherein the X and Y axes show the frequency and spectrum, respectively.

The example of FIG. 10 is constituted for the purpose of the television telephone, and the simultaneous two-directional communication for both sound and image signals can be achieved with only one telephone line by utilizing the frequency division system. When the user is in the conversation, the system operation is the same as the normal multiple communication using the frequency separation system, however when the conversation is interrupted, the respective terminal device detects as to whether the user is now speaking or not, and any signal or data representing the detected status is transmitted to the opposite terminal device. In the case where the telephone line is utilized as a transmission line, the usable frequency band is 300 Hz-3.4 KHz. If the frequency band of 400 Hz-1.5 KHz is used for sound signals (for conversation) and 2 KHz-3 KHz is used for image data signals (as shown in FIG. 11), it is possible for the signal (or data) for transmitting the detected status mentioned above 1 to use the signal having the frequency of 1.75 KHz between both frequencies, 2 to use the signal having the frequency of 350 Hz between the lower limit 300 Hz in the usable transmission frequency band and the lower limit 400 Hz in the usable sound signal, 2 to use the signal having the frequency of 2 KHz between the upper limit 3 KHz in the usable frequency and the upper limit 3.4 KHz in the usable image signal. Thus, the respective terminal devices can detect the status signal showing the fact that the sound signal is interrupted at both terminal devices, therefore at that time the transmission for the image data signal can be achieved through the frequency band used for the sound signal by switching the switches S1 and S2 provided in the respective terminal devices. Of course, the carrier frequency used at that time is within the band 400 Hz-1.5 KHz, therefore the transmission rate becomes also lower than that of the image data signal of 2 KHz-3 KHz. In the case of the television telephone, the image data to be transmitted is once memorized, and the write/read operation can be accessible at random, therefore the detected signal can be controlled by the CPU.

It is possible to achieve a high precision operation of the system in which the detected signals for providing the automatic balanced condition is controlled by the CPU, in comparison with the case using the manual operation or semi-fixed resister.

The operation speed required for CPU controlling the transmission system through the telephone line is sufficient with about 8 bits. During no conversation at both terminal devices, the transmission utilizing both of the frequency band for image data signal and the frequency band for sound signal is achieved. As mentioned above, the access to the memory can be effected at random, therefore if the memory has 0 to 100 addresses for the image data, it may be possible to transmit from the data stored in the 0 address in the image data band and to transmit from the data stored in the 100 address in the sound signal band.

During the operation mentioned above, if either of the terminal devices detects the fact that either user again starts the conversation, each terminal device can detect such status by the detected signal of the data. At that time each terminal device is returned back to the normal condition.

At that time, the usable condition for the conversation is achieved after the operation switch has been effected, therefore the sound input signal is delayed by using a BBD circuit or the like as shown in FIG. 10. By this the sound due to the speaker is transmitted to the opposite side, and it is sufficient for the normal operation to set the delay time as below about 100 ms. A mute circuit located at the sound output unit is provided for the purpose of preventing the output of the sound signal, since the image data signals are transmitted even in the frequency band for the sound signals. According to the example, there is provided a method of transmitting the image data signals when the frequency band for the sound signals is not used. However, on the other hand, when the image data signals to be transmitted are little, namely when the image obtained by a television camera in the television telephone is not changed, in other words the image is not moved in comparison with each image, it is sufficient to transmit only the data concerning the difference between the previous image and the current image. According to such transmission system, the image data to be necessary for transmission becomes little thereby enabling the transmission rate at low level. Furthermore, the modulation rate in the modulation necessary to transmit the image data on the telephone line may be reduced and the transmission frequency band may be also reduced. By this, the high frequency band limited for the sound signals may be increased, and the high band of the sound signal can be transmitted thereby improving the clearness of the sound. Furthermore, if the above two methods are combined, the utilization efficiency of the transmission line is remarkably increased and further there is presented a transmission system with high fidelity sound and high speed. The above-mentioned switching operation may be effected manually, and automatically by utilizing the CPU by means of detecting the amount of image data to be necessary for the transmission by the comparison of the data stored in the memory and the conversation condition.

According to the above examples, the switching operation is effected by detecting the terminal status on both ends, however it may be possible to switch on the basis of the status of either one terminal device and also to decide the operation condition of the opposite terminal device.

The system of FIG. 10 employs only a single crosstalk cancel circuit on each side of the system. In this arrangement, the output of the camera is directed to the respective crosstalk cancel circuit via a memory, a modulator and a high pass filter. The output of the respective crosstalk cancel circuit is directed to the image output unit via a high pass filter, a demodulator and a memory. The memories are coupled to a control unit which is also connected to the output of the crosstalk cancel circuit via an acknowledge signal detect circuit.

In addition another modulator is coupled to the input of the crosstalk cancel circuit via a switch, and the output of the crosstalk cancel circuit is coupled to a demodulator via the switch. This latter modulator and demodulator are coupled to the control unit.

The output of a sound input unit is coupled to the control unit, and also to the crosstalk cancel circuit via an amplifier, a delay circuit and a low pass filter. The input of a sound output unit is coupled to the crosstalk cancel circuit via a low pass filter, a mute circuit and an amplifier.

The control unit is coupled to a sound input/output unit controller (not illustrated).

The two crosstalk cancel circuits are coupled via a telephone line.

The switches S1 and S2 in FIG. 10 are illustrated merely for explaining, and they are in actual electronic switches composed of such as a CPU.

The examples shown in FIGS. 6 to 10 can be applicable for a wire type system, a wireless type system or the like.

I claim:

1. In a transmission system for a television telephone in which a pair of terminal devices are interconnected via a transmission path, each terminal device including means coupled to applying sound signals and image data signals to said transmission path and means coupled to receive sound signals and image data signals, to minimize cross talk of signals on the transmission path, and to enable two-directional communication in an entire frequency band usable on said transmission path or a portion thereof, the improvement wherein each terminal comprises crosstalk canceling means coupled to said transmission path, said means for applying signals to said path includes for applying said sound and image data signals to said transmission path via said crosstalk canceling means including frequency separation means connected to separate at least one of said sound signals and said image data signals into a plurality of different frequency bands for application to said transmission path, and a single side band system connected to narrow the frequency band of said image data signals for transmission on said transmission path.

2. A transmission system for a television telephone according to claim 1, wherein said transmission path includes a plurality of transmission lines and said means for applying signals comprises means connected to separate said image data signals into a plurality of different frequency bands for transmission via said crosstalk canceling means on all of said transmission lines, and means for applying said sound signal to less than all of said transmission lines via said crosstalk canceling means, whereby frequency bands of different frequency of said sound and image signals are transmitted on at least one of said transmission lines, and means for reducing the transmitted band width of said sound signal.

3. A transmission system for a television telephone according to claim 1, wherein said transmission path includes a plurality of transmission lines and said frequency separation means is connected to separate each of said sound signals and said image data signals into a plurality of different frequency bands, and further comprising frequency converting means connected to expand at least one of the frequency bands of said sound signal for the reception of sound signals.

4. A transmission system for a television telephone according to claim 1, wherein said transmission path includes a plurality of transmission lines, said frequency separation means is connected to separate each of said sound signals and said image data signals into a plurality of different frequency bands, with a frequency band of each of said sound and image data signals applied to each of a plurality of said transmission lines via said crosstalk canceling means, and further comprising switch means connected to selectively control the transmission of said sound signals and image signals of at least one frequency band via at least one of said transmission lines to enable alternate use of said frequency band for image and sound signals.

5. A transmission method for a picturephone unit comprising the steps of:
transmitting a voice signal and an image data signal using cancel circuits provided at terminal units arranged at opposite ends of a single transmission path, the transmission path being a telephone line having a frequency band that can pass a voice band;
controlling the crosstalk value between transmission signals to be a minimum;

simultaneously and bidirectionally transmitting said voice signal and said image data signal only through said single transmission path in different frequency ranges of a common frequency band;

separating said frequency band at an arbitrary frequency into a voice signal range and an image signal range; and narrowing an occupied band width for said image data signal by use of an SSB mode so as to ensure a voice signal transmission band.

6. A transmission method for a picturephone unit comprising the steps of:

transmitting a voice signal and an image data signal using cancel circuits provided at terminal units arranged at opposite ends of a single transmission path, the transmission path being a telephone line having a frequency band that can pass a voice band;

controlling the crosstalk value between transmission signals to be a minimum;

simultaneously and bidirectionally transmitting said voice signal and said image data signal only through said single transmission path in different frequency ranges of a common frequency band in a part of a transmissible frequency band;

separating said frequency band at an arbitrary frequency into a voice signal range and an image signal range; and narrowing an occupied band width for said image data signal by use of an SSB mode so as to ensure a voice signal transmission band.

* * * * *